P. M. KNUTSON.
TRACTOR HITCH FOR DRILLS AND DRAGS.
APPLICATION FILED NOV. 15, 1911.
1,041,815.
Patented Oct. 22, 1912.
3 SHEETS—SHEET 1.
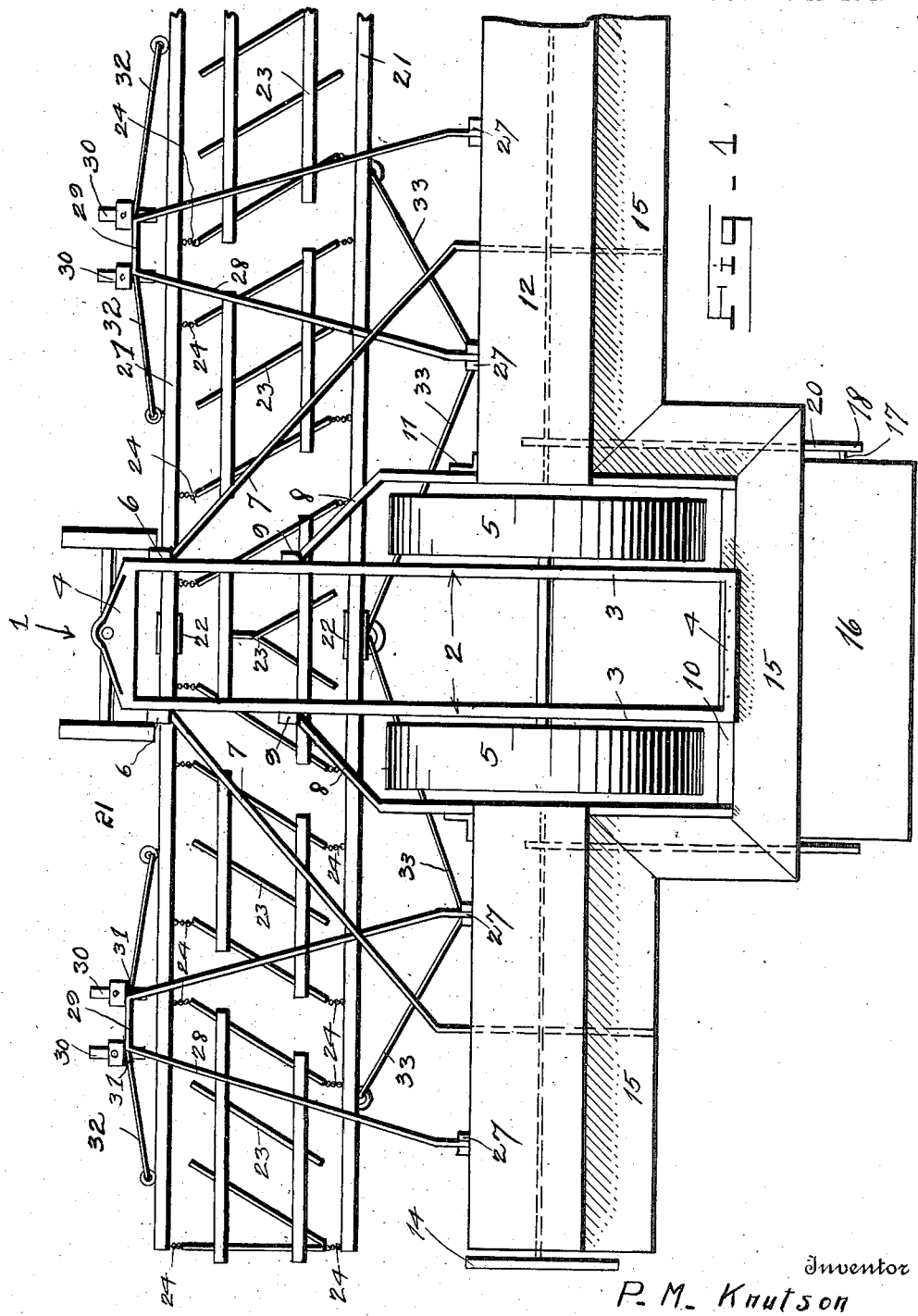
Witnesses
Inventor
P. M. Knutson
By Harry Ellis Chandler
Attorney P. M. KNUTSON.
TRACTOR HITCH FOR DRILLS AND DRAGS.
APPLICATION FILED NOV. 15, 1911.
1,041,815.
Patented Oct. 22, 1912
3 SHEETS—SHEET 2.
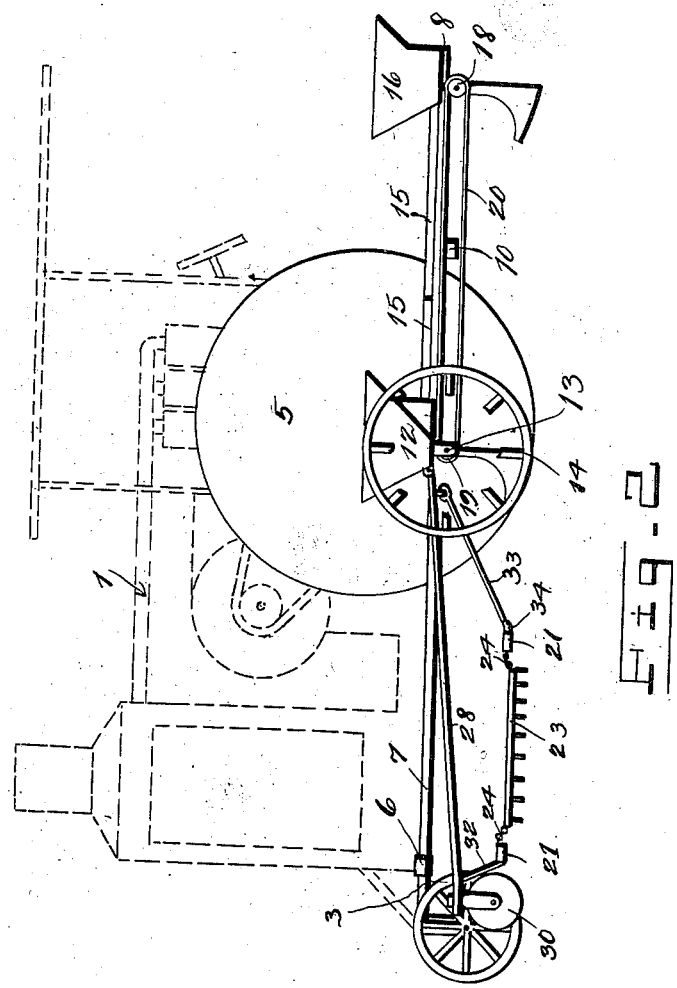
Witnesses
Herbert L. Porter
[signature]
Inventor
P. M. Knutson
By Harry Ellis Chandler
Attorney

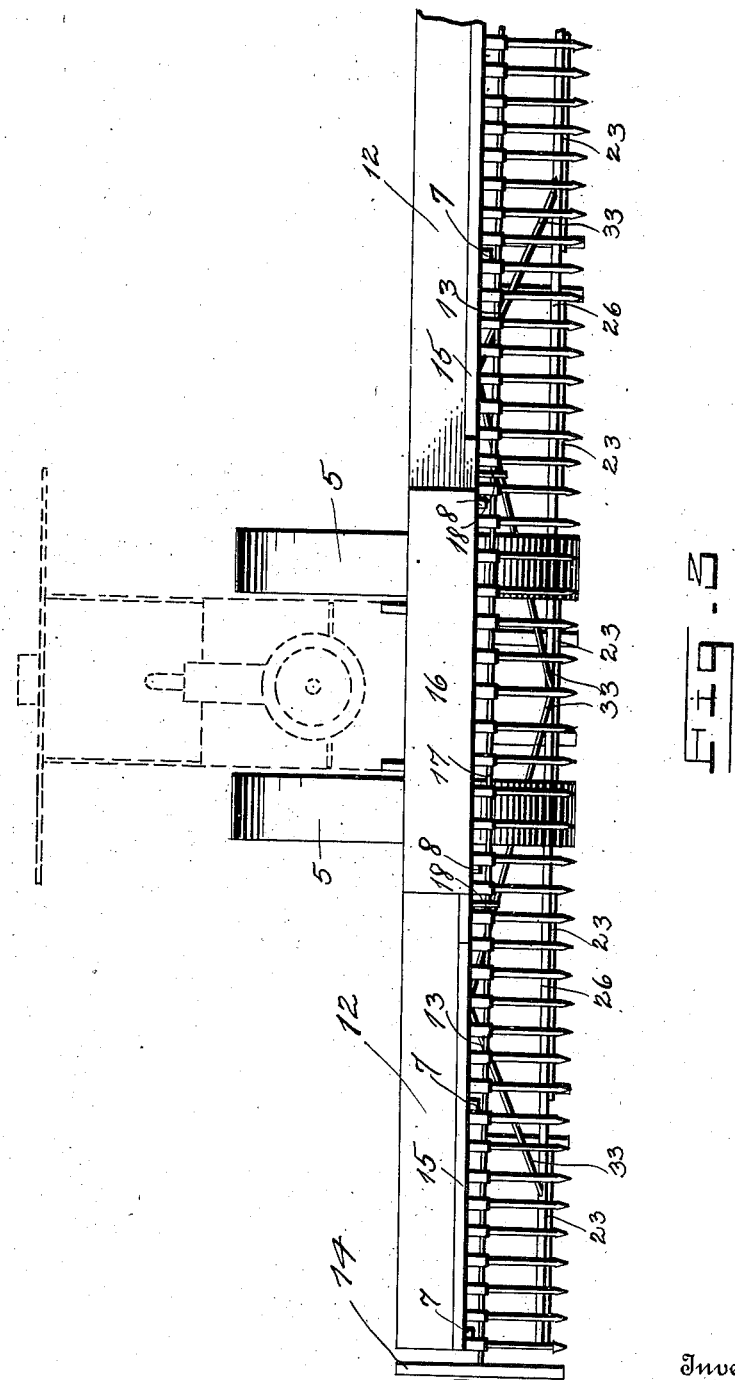

UNITED STATES PATENT OFFICE.

PEDER M. KNUTSON, OF CLIFFORD, NORTH DAKOTA, ASSIGNOR OF ONE-HALF TO JOHN FALKENHAGEN, OF GALESBURG, NORTH DAKOTA.

TRACTOR-HITCH FOR DRILLS AND DRAGS.

1,041,815.      Specification of Letters Patent.      Patented Oct. 22, 1912.

Application filed November 15, 1911. Serial No. 660,394.

*To all whom it may concern:*

Be it known that I, PEDER M. KNUTSON, a citizen of the United States, residing at Clifford, in the county of Traill and State of North Dakota, have invented certain new and useful Improvements in Tractor-Hitches for Drills and Drags, of which the following is a specification.

This invention relates to improvements in combined cultivators and drills, the same being adapted to be attached to the frame of a tractor, whereby the devices are propelled.

A further object of the invention is to produce a device of this character which may be easily and quickly attached to the frame of the usual tractor so that the drills will be positioned immediately behind the harrows, whereby the soil is pulverized and conditioned for the drills.

Other objects and advantages will be apparent from the following description taken in connection with the accompanying drawings and it will be understood that changes in the specific structure shown and described may be made within the scope of the claims without departing from the spirit of the invention.

In the drawings: Figure 1 represents a top plan view of the device, the same being shown as applied to a tractor frame. Fig. 2 represents a side elevation of the device. Fig. 3 represents a rear elevation of the same.

Referring to the drawings, the numeral 1 designates a tractor of any well known construction and includes a frame 2, which consists of side sills 3 and end sills 4, said frame being supported near its rear end by traction wheels 5. Upon the side sills 3, and near the front end thereof are secured boxings 6, and into which is bolted the forward ends of the bars 7, said bars extending rearwardly and in oblique relation to the side sills 3, the rear ends of said bars being then bent so as to assume a position parallel with the side sills 3, and terminate at a point short of the rear end sill 4 of the frame 1.

A pair of bars 8 are provided and have their front ends bolted in boxings 9 mounted upon the side sills 3 and a short distance rearward of the boxings 6. The bars 8 are formed in a manner similar to the bars 7, the extreme rear ends of which project slightly beyond the rear end sills 4 of the frame, and are supported upon the opposite ends of a beam 10, said beam being bolted and supported by the rear end of the frame 1, the opposite ends of said beam projecting slightly beyond the traction wheels 5 so as to support the bars 8 at this point, whereby the same are held spaced from the outer sides of the said wheels.

Bolted to the bars 8 and arranged in spaced relation are right angle brackets 11, and to which is bolted the inner end of the hoppers 12, each of which being provided with a dropper shaft 13, the outer ends of which extend slightly beyond the outer ends of the hoppers 12 for receiving the drive wheels 14. The bars 7 have their rear ends passed under the central portion of each of the hoppers 12, and extend a short distance beyond the rear walls of the hoppers 12, and are adapted to aid in supporting the platforms 15, said platforms being for the purpose of permitting the operator to refill the hoppers with seed and to watch the operation of the drills.

Supported upon the rear ends of the bars 8 is a hopper 16 also provided with a dropper shaft 17 to the opposite ends of which are fixed sprocket wheels 18, said sprocket wheels being arranged in direct alinement with similar wheels 19 fixed to the opposing ends of the dropper shafts 13. Passing around the sprocket wheels 18 and 19 are sprocket chains 20, said sprocket chains being compelled to travel during the propulsion of the tractor which causes the drive wheels 14 to revolve and rotate the dropper shafts 13, thereby imparting similar movement to the dropper shaft 17 of the hopper 16.

Passing beneath the frame 2 and slightly in advance of the traction wheels 5 are a pair of transversely arranged beams 21, said beams being arranged in spaced parallel relation, the purpose of which will be hereinafter described. The beams 21 may be formed from a single length of timber or they may be formed in sections, the meeting ends of each section being clamped between the plates 22, as clearly shown in Fig. 1 of the drawing. This is only necessary in cases where timbers of the desired length are not obtainable.

Placed between the beams 21 are a series of harrows 23, said harrows being of any well known construction. To the front ends of the harrows 23 are secured the rear ends of chains 24, the front ends of which being secured to the outer beam 21. The inner ends of the harrows 23 are connected to the inner beam 21 in a similar manner, whereby the harrows may be moved backward or forward during such travel of the tractor 1.

Mounted upon the front faces of the hoppers 12 are a pair of spaced castings 27 and to which is pivotally connected the inner ends of the V-shaped members 28, said members being so formed as to produce a transverse bar 29, and to which is connected a pair of caster wheels 30, the length of the members 28 being such as to position the caster wheels 30 in advance of the outer beam 21.

Rigidly connected to the transverse bars 29 of the members 28 are ears 31 and to which are pivotally connected the outer ends of links 32, the inner ends of which being similarly connected to the outer beam 21, as clearly illustrated in Fig. 1 of the drawing.

A pair of convergingly arranged links 33 are provided and have their outer meeting ends pivotally connected to one of the pairs of castings 27 carried by the hoppers 12, and their outer ends pivotally connected in any suitable manner to the inner beam 21, so that when the machine is moving forward the beams 21 carrying the harrows 23 will be pulled in this direction by the links 32, and should it be necessary to back the machine, the beams 21 will be drawn by the links 33. It will be noted that by connecting the beams in this manner that the same are adapted to flex to accommodate the harrows 23 in passing over rough or uneven ground.

It will be, of course, understood that the bars 7 and 8 and the members 28 are formed from stout metal so as to withstand the strain incident to and during the travel of the tractor.

It is obvious that the dropping shafts of the hoppers 12 and 16 may be provided with suitable clutch mechanism (not shown) to throw the same in and out of operation.

The operation of the device is as follows: Upon the tractor being propelled in a forward direction across a field the members 28 being pivotally connected and provided with the caster wheels 30 will drag the beams 21 and harrows 23, but at the same time, allowing sufficient movement to the same to accommodate themselves to the rough and uneven ground. During this movement the driving wheels 14 will cause rotation of the dropping shafts 13 and dropping shafts 17 through the sprocket chains 20, thereby causing the seed to be dropped from each hopper simultaneously. When the machine is moved in a rearward direction it is only necessary that the dropping shafts be thrown out of gear so that injury to the drill teeth and dropping shaft is prevented, the harrows being permitted to travel backward and will retain their proper position for forward travel.

What is claimed is:

1. The combination with a tractor including a frame, of a pair of spaced beams arranged transversely thereof, a series of harrows flexibly connected to said beams, a pair of bars rigidly connected to the frame near the outer end of the frame and extending rearwardly and slightly beyond said frame, a hopper supported upon the extended ends of said bars, hoppers secured to the outer sides of said bars and in advance of the first mentioned hopper, and means carried by the second mentioned hoppers to operate the drop shaft of the first mentioned hopper.

2. The combination with a tractor including a frame consisting of side and end sills, a beam rigidly connected to the rear end sill of the frame, a pair of bars having their forward ends rigidly connected to the side sills of the frame and their rear ends projected beyond the rear end sill, and supported upon the said beam, a hopper supported upon the projected ends of said bars, a second pair of bars having their outer ends rigidly connected to the side sills of the frame, and in advance of the outer ends of the first mentioned pair of bars, said second pair of bars extending rearwardly and stopping at a point short of the rear sill of said frame, hoppers connected to the sides of the first mentioned bars, said hoppers being also connected to the central portion of the last mentioned hoppers, and a series of flexibly connected harrows arranged in advance of said hoppers.

3. The combination with a tractor including a wheeled supported frame, of a pair of bars rigidly connected to said frame and extending rearwardly, hoppers connected to and supported by said bars, a pair of beams arranged transversely of said frame and in advance of the hoppers, a series of harrows flexibly connected between said beams, V-shaped members pivotally connected to certain of said hoppers at their rear ends, said members being provided at their forward ends with caster wheels, and pivotally connected links connecting the beams with the forward end of the V-shaped members and certain of the hoppers.

In testimony whereof I affix my signature, in the presence of two witnesses.

PEDER M. KNUTSON.

Witnesses:
H. N. KLEO,
H. KNUDSON.